(12) United States Patent
Cook

(10) Patent No.: US 9,565,372 B2
(45) Date of Patent: Feb. 7, 2017

(54) COMPACT SHORT FLAT-FIELD SCHMIDT OPTICS FOR MM-WAVE OPERATION

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/466,290

(22) Filed: Aug. 22, 2014

(65) Prior Publication Data

US 2016/0057364 A1 Feb. 25, 2016

(51) Int. Cl.
*H01L 25/00* (2006.01)
*H04N 5/33* (2006.01)
*G01V 8/00* (2006.01)
*G02B 17/08* (2006.01)
*G02B 23/06* (2006.01)

(52) U.S. Cl.
CPC ............... *H04N 5/33* (2013.01); *G01V 8/005* (2013.01); *G02B 17/08* (2013.01); *G02B 17/0852* (2013.01); *G02B 17/0888* (2013.01); *G02B 23/06* (2013.01)

(58) Field of Classification Search
CPC ........ H04N 5/33; H01L 27/14649; G01J 5/20; G01J 2005/0077; G01J 5/08
See application file for complete search history.

(56) References Cited

U.S. PATENT DOCUMENTS 3,430,248 A 2/1969 Lightbrown
4,507,551 A * 3/1985 Howard et al. ............... 250/216
6,919,988 B2 * 7/2005 Cook ............................. 359/356
7,933,067 B1 * 4/2011 Cook ............................. 359/399
9,110,276 B2 * 8/2015 Cook
2008/0023632 A1 * 1/2008 Ridgway et al. .......... 250/338.1
2012/0026382 A1 * 2/2012 Moskun et al. ............... 348/335
2013/0088714 A1 * 4/2013 Terada et al. ............... 356/237.5
2013/0257646 A1 * 10/2013 Gopalsami et al. .......... 342/179

OTHER PUBLICATIONS

Physics 142, Lenses and Mirrors.*
Linfoot et al., "On the Aberrations of the Field-Flattened Schmidt Camera", Monthly Notices of the Royal Astronomical Society, Vol No. 109, Jan. 1, 1949, pp. 535-556.
International Search Report and Written Opinion mailed Sep. 16, 2015 in WO Application No. PCT/US2015/037855, 41 Pages.

* cited by examiner

*Primary Examiner* — David Porta
*Assistant Examiner* — Mamadou Faye
(74) *Attorney, Agent, or Firm* — Lando & Anastasi, LLP

(57) ABSTRACT

Millimeter-wave optical imaging systems and methods. In one example, a mm-wave optical imaging system includes a mm-wave imaging detector located at a focal plane of the optical imaging system, an immersion lens directly coupled to the imaging detector and configured to focus the electromagnetic radiation onto the imaging detector, the immersion lens having a curved first surface and an opposing planar second surface, wherein the focal plane is located on the planar second surface and the imaging detector is directly coupled to the planar second surface, a positive power primary mirror configured to reflect the electromagnetic radiation towards the immersion lens, and a Schmidt aspheric corrector configured to receive and direct the electromagnetic radiation towards the primary mirror, wherein the system aperture stop is located on the Schmidt aspheric corrector.

15 Claims, 8 Drawing Sheets

Table of Optical Prescription

| Surface | Description | Rd | cc | Ad | Ae | Af | Ag | Thickness | Material |
|---|---|---|---|---|---|---|---|---|---|
| 1 | Stop, Corrector | Infinity | | | | | | 2.000 | n = 1.60 |
| 2 | | Infinity | | 2.864E-06 | 4.988E-10 | 1.342E-12 | -8.302E-17 | 31.018 | Air |
| 3 | Primary mirror | -55.063 | 0.66422 | 3.341E-07 | 6.632E-11 | 9.146E-14 | -1.567E-17 | -22.973 | Refl. |
| 4 | Immersion lens | -13.092 | 1.16828 | 5.128E-05 | -1.237E-06 | 2.242E-08 | -8.752E-11 | -6.066 | n = 1.60 |
| 5 | | Infinity | | | | | | 0.000 | n = 1.60 |
| 6 | Focal plane | Infinity | | | | | | 0.000 | n = 1.60 |

Units above are inches

Aperture diameter = 52.0 inches

Field of view diameter = 20.0 degrees

Image diameter = 8.0 inches

Wavelength = 5.0 mm

Real-ray focal length = 22.69 inches

Real-ray F-number = F/0.44

FIG. 5

COMPACT SHORT FLAT-FIELD SCHMIDT OPTICS FOR MM-WAVE OPERATION

BACKGROUND

The millimeter-wave (mm-wave) region of the electromagnetic spectrum (wavelengths on the order of a few millimeters or centimeters, for example) is used for a variety of communications applications. Additionally, there exist some mm-wave imaging systems. For example, U.S. Pat. No. 6,919,988 describes an example of a combined mm-wave and infrared imaging system. Generally, mm-wave transceivers have a very small field of view and therefore must be pointed over some larger field of regard. Pointing is often achieved using a classical gimbal arrangement, which requires additional volume, weight, and power to implement. Conventional attempts to achieve a "wide" field of view in mm-wave optics have been limited to a range of approximately 4-5 degrees.

SUMMARY OF INVENTION

Aspects and embodiments are directed to mm-wave optics that can provide approximately a 20 degree field of view. For many applications, this eliminates the need for the gimbal associated with conventional systems, and thus the volume, weight, and power requirements of the gimbal are no longer needed. Additionally, aspects and embodiments provide a system with a compact optical form and fast optical speed, as discussed further below.

According to one embodiment, a millimeter-wave optical imaging system includes an imaging detector located at a focal plane of the optical imaging system, the imaging detector being responsive to electromagnetic radiation in wavelength range of approximately 5-50 millimeters, and a field lens directly coupled to the imaging detector and configured to focus the electromagnetic radiation onto the imaging detector, the field lens having a curved first surface and an opposing planar second surface, wherein the focal plane is located on the planar second surface and the imaging detector is directly coupled to the planar second surface. The system further includes a positive power primary mirror configured to reflect the electromagnetic radiation towards the field lens, and a Schmidt aspheric corrector configured to receive and direct the electromagnetic radiation towards the primary mirror, wherein the system aperture stop is located on the Schmidt aspheric corrector. In one example, the field lens is an immersion lens.

In one example, the imaging detector is a focal plane array sensor.

In one example, the primary mirror is a positive power spherical mirror. In another example, the primary mirror is a positive power conic mirror. In another example, the primary mirror has a higher order general aspheric figure. In one example, the first surface of the immersion lens is spherical. In another example, the first surface of the immersion lens is conic. In another example, the first surface of the immersion lens is aspheric.

According to one example, the immersion lens is composed of a material having a refractive index in a range of approximately 1.6-4.0. The system may have a field of view of approximately 20 degrees, for example. In one example, the system has an optical speed of approximately F/0.44. The imaging sensor may include a two-dimensional array of pixels. In one example, each pixel has a width approximately equal to one half a central operating wavelength of the system. In one example, the central operating wavelength is approximately 5 mm.

The system may further include a transceiver coupled to the imaging sensor. The imaging sensor may include a two-dimensional array of pixels, a first pixel of the array being associated with a first communication channel of the transceiver, and a second pixel of the array being associated with a second communication channel of the transceiver.

According to another embodiment, a method of imaging in a millimeter-wave spectral band includes acts of receiving electromagnetic radiation in the millimeter-wave spectral band via a system aperture stop located on a Schmidt corrector, directing the electromagnetic radiation from the Schmidt corrector to a positive power primary mirror, reflecting the electromagnetic radiation from the primary mirror onto an immersion lens, focusing the electromagnetic radiation with the immersion lens onto a focal plane located on a rear surface of the immersion lens, and imaging the electromagnetic radiation with an imaging detector array configured for the millimeter-wave spectral band, the imaging detector being located at the focal plane and directly coupled to the rear surface of the immersion lens.

According to another embodiment, a method of millimeter-wave communications includes receiving electromagnetic radiation in the millimeter-wave spectral band via a system aperture stop located on a Schmidt corrector, the electromagnetic radiation including a first signal corresponding to a first communication channel and a second signal corresponding to a second communication channel, the first signal being received at the Schmidt corrector at a first angle of incidence, and the second signal being received at the Schmidt corrector at a second angle of incidence. The method further includes directing the electromagnetic radiation from the Schmidt corrector to a positive power primary mirror, and reflecting the electromagnetic radiation from the primary mirror onto an immersion lens, and focusing the electromagnetic radiation with the immersion lens onto a focal plane located on a rear surface of the immersion lens. The method further includes imaging the electromagnetic radiation with an imaging detector array configured for the millimeter-wave spectral band, the imaging detector being located at the focal plane and directly coupled to the rear surface of the immersion lens, and including a two dimensional array of pixels, wherein imaging the electromagnetic radiation includes imaging the first signal with at least one first pixel of the array and imaging the second signal with at least one second pixel of the array, the at least one second pixel being spatially separated from the at least one first pixel. The method further includes providing a first image signal from the at least one first pixel to a communications transceiver, the first image signal corresponding to the first signal, and providing a second image signal from the at least one second pixel to the communications transceiver, the second image signal corresponding to the second signal.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 5 is a table showing an optical prescription of one embodiment of a millimeter-wave optical imaging system according to aspects of the present invention;

DETAILED DESCRIPTION

Imaging in the visible and infrared spectral bands is widely used for a variety of different applications. Aspects and embodiments are directed to an optical imaging system operating in a region of the electromagnetic spectrum where imaging is not typically done. In particular, aspects and embodiments provide an optical imaging system that leverage advances in focal plane array (FPA) sensor technology that have extended the imaging capability of these sensors to the millimeter-wave (mm-wave) spectral band. For example, certain embodiments may use large, multi-element two-dimensional (2D) FPA sensors operating in the 5-50 mm wavelength range, with pixel sizes on the order of about a half wavelength. As discussed above, conventional mm-wave systems have been limited to a field of view (FOV) of no more than about 5 degrees, and therefore typically require a gimbal for pointing over a larger field of regard. By extending imaging techniques used in the visible and/or infrared spectral bands, and leveraging the capability of newer FPA sensors, aspects and embodiments may provide mm-wave optics having a FOV of approximately 20 degrees, thereby eliminating the need for the gimbal associated with conventional systems for many applications.

Certain aspects and embodiments are directed to a mm-wave optical imaging system having a compact optical form, wide field of view, and fast optical speed. As discussed in more detail below, certain embodiments adapt the classical Schmidt optical system for operation in the mm-wave domain, with meter-class apertures, fields of view extending beyond 20 degrees in diameter, and optical speeds faster than F/0.5. Additionally, in certain embodiments, the aperture obscuration of the mm-wave focal plane array (FPA) is held to a very acceptable 30% linear value (<10% area), and the physical length of the optical system is less than 75% of the aperture diameter.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
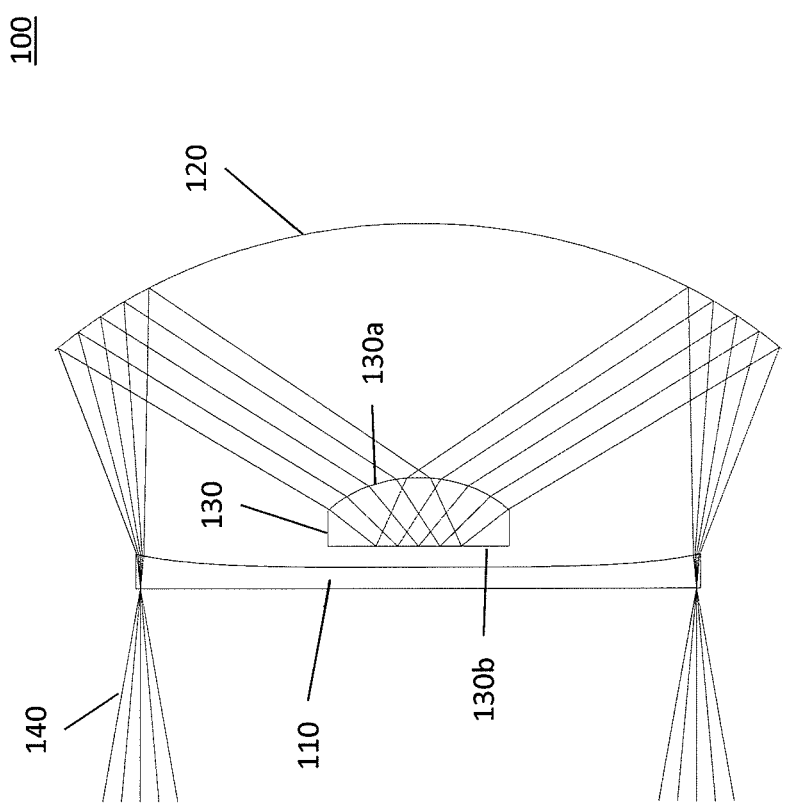
FIG. 1 is a ray trace section of one example of short flat-field Schmidt optics for a millimeter-wave optical imaging system according to aspects of the invention.

According to certain embodiments, an mm-wave optical imaging system is based on short flat-field Schmidt optics adapted for operating in the mm-wave spectral band. Referring to FIG. 1, there is illustrated a ray trace section of one example of an optical imaging system according to some embodiments. The optical system 100 is catadioptric (meaning using both mirrors and lenses), and has a short flat-field Schmidt optical form designed to image mm-wave electromagnetic radiation. The optical system 100 includes three optical elements, namely, a full aperture Schmidt aspheric corrector 110, a highly curved spherical or aspheric primary mirror 120, and an immersion lens 130. Incident electromagnetic radiation 140 is directed by the Schmidt aspheric corrector 110 to the primary mirror 120, and is reflected off of the primary mirror 120 towards the immersion lens 130. The system aperture stop is located on the edge of the Schmidt aspheric corrector 110, as shown in FIG. 1. The immersion lens 130 acts as a field lens, and the system image plane is located on the rear surface 130b of the immersion lens.

The primary mirror 120 can be any reflecting surface of conventional design and construction capable of reflecting radiation at the desired wavelengths (mm-wave in the illustrative embodiment). For example, a metal coating (such as gold, aluminum, or silver) applied to any kind of substrate may be suitable.

Figure 2:
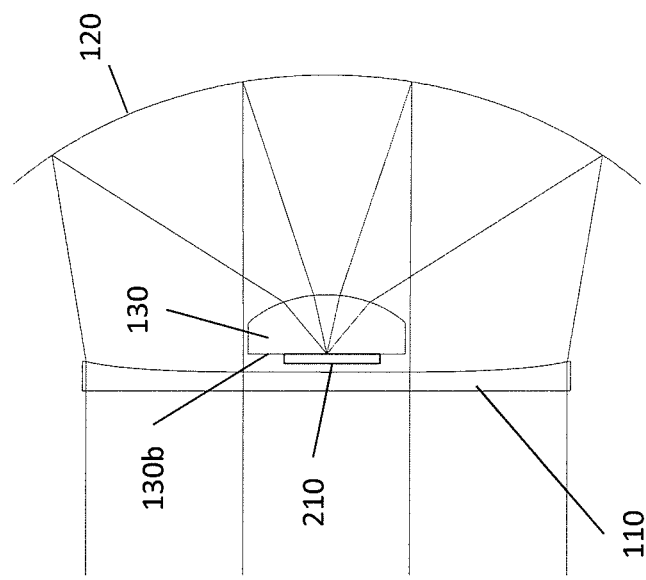
FIG. 2 is a diagram of an example of the millimeter-wave optical imaging system of FIG. 1, according to aspects of the invention.

Central to certain embodiments is the inclusion of the immersion lens 130 immediately attached to the focal plane. As is known in the art, an immersion lens 130 is a solid optical element comprised of a transmitting material with a suitable refractive index, and having a near hemispherical first surface 130a and an opposing flat second surface 130b. The first surface 130a of the immersion lens 130 may be spherical, conic, or of a higher-order general aspheric figure. An FPA sensor, or other detector, may be attached directly to the second surface 130b (as shown in FIG. 2). The refractive index of the lens effectively decreases the wavelength of the millimeter wave electromagnetic radiation, allowing a smaller detector to collect the same amount of radiation as would a larger detector in air. Referring to FIG. 2, in accordance with certain embodiments, a detector array 210 is placed in intimate contact with the second surface 130b of the immersion lens 130. In addition, use of the immersion lens 130 may flatten the field and correct for otherwise-present, and potentially severe, comatic and astigmatic aberrations in the system.

Figure 3:
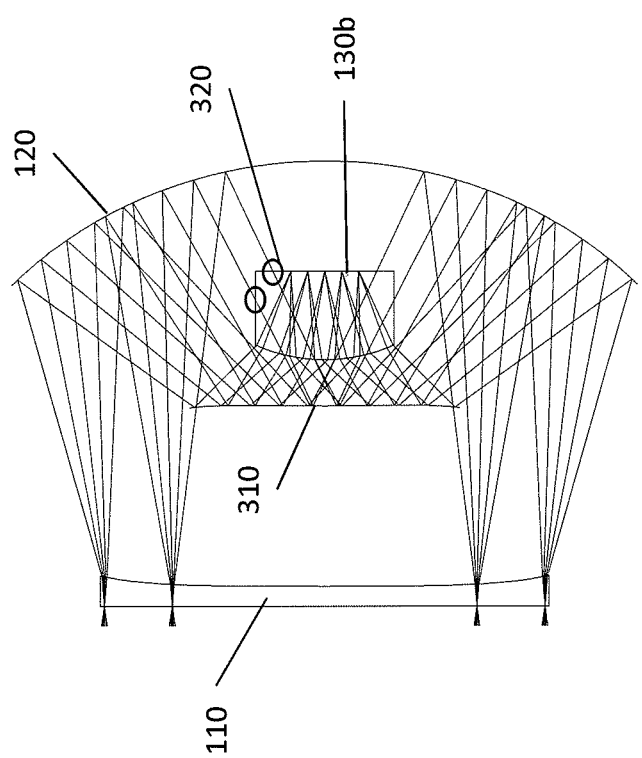
FIG. 3 is a ray trace section of an alternate configuration of a millimeter-wave optical imaging system according to aspects of the invention.

The optical form illustrated in FIGS. 1 and 2 places the detector array 210 "behind" the immersion lens 130, between the immersion lens and the Schmidt aspheric corrector 110. This arrangement complicates access to the detector array 210. Accordingly, conventional wisdom suggests modification of the shown optical form to a Cassegrain-like or folded arrangement, as shown in FIG. 3. In this arrangement, the orientation of the immersion lens 130 is reversed, and a fold mirror 310 is added that reflects radiation received from the primary mirror 120 towards the immersion lens. However, surprisingly, ray-trace simulations have demonstrated that this arrangement in fact significantly worsens system performance. In particular, for the same aperture and immersion lens sizes, the folded arrangement of FIG. 3 more than doubles the central obscuration relative to the arrangement of FIGS. 1 and 2. As a result, certain rays cannot reach the detector array, as indicated at circles 320 in FIG. 3. Increasing the aperture size worsens the situation, as the obscuration percentage increases faster than the aperture.

Figure 4:
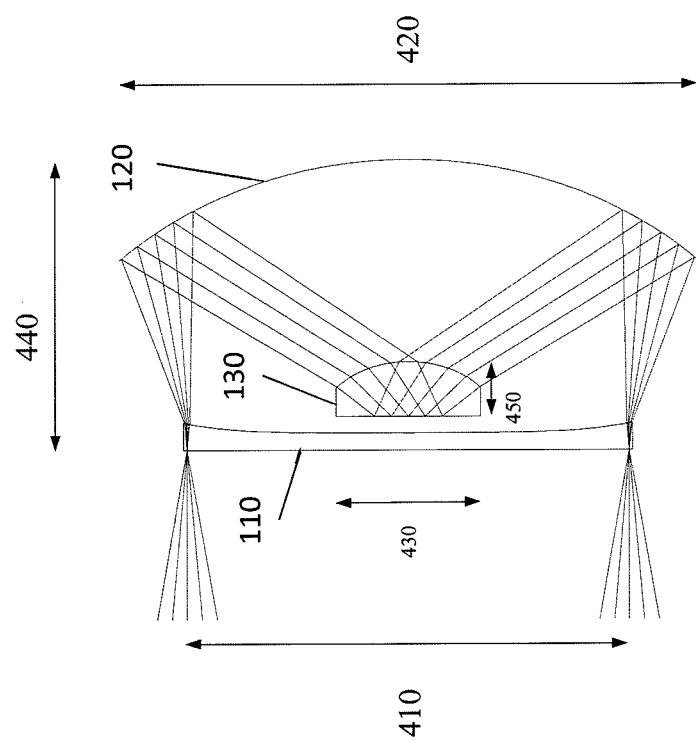
FIG. 4 is a ray trace section of another example of the millimeter-wave optical imaging system optics of FIG. 1, according to aspects of the invention.

Referring to FIG. 4, there is illustrated a diagram of a nominal design of a short flat-field Schmidt-based mm-wave optical imaging system according to one embodiment. Table 1 below provides an example of corresponding parameters and features of the system of FIG. 4. In this example, the system includes a full aperture Schmidt aspheric corrector 110, as discussed above, composed of a moderate refractive index material (e.g., n=1.6-1.7, approximately). The positive power primary mirror 120 has a diameter that is approximately 2.25× its focal length (f=R/2). The immersion lens 130 is composed of a moderate or higher refractive index material (e.g., 1.5<n<4.0), and has a diameter that is approximately 2× the size of a mm-wave FPA (not shown) that is coupled to the lens and positioned at the image plane on the rear surface of the lens, as discussed above. In one example, corresponding to Table 1 below, the system has an aperture size 410 of 52 inches, a primary mirror diameter 420 of 68 inches, and an immersion lens (field lens) diameter 430 of 17 inches. For the immersion lens 130 being composed of a material having a refractive index of $n_{il}$=1.8, the optical system has a system length 440 of 32.4 inches, and the immersion lens 130 has a thickness 450 of 6.4 inches. For this example, changing the refractive index of the immersion lens to $n_{il}$=1.6, results in a system length 440 of 31.9 inches, and an immersion lens thickness 450 of 6.0 inches.

TABLE 1

| Parameter | Value | Comment |
|---|---|---|
| Aperture (in.) | 52 | |
| System focal length (in.) | 22.7 | Paraxial; f = 4/tan10 |
| F-number | F/0.44 | Paraxial; for $n_{il}$ = 1.8 |
| Image size (in.) | 8.0 | |
| FOV (deg.) | 20.0 | |
| Mirror EFL (in.) | 28.3 | Paraxial |
| Field lens EFL (in.) | 17.8 | Paraxial |
| F-cone full angle (deg.) | 79.3 | Real ray; for $n_{il}$ = 1.8 |

The optical configuration of FIGS. 1, 2, and 4, and in accord with various embodiments, is highly robust with respect to the refractive index, $n_{il}$, of the material of the immersion lens 130. This is at least in part due to the placement of the immersion lens 130 at/near the image plane, and because the electromagnetic radiation does not travel outside of the lens once it enters the lens (as discussed above, the FPA sensor may be directly attached to the rear surface 103b of the lens). Ray trace simulations have demonstrated that the refractive index, $n_{il}$ may vary over a range of values, for example, approximately 1.5-4.0 as discussed above, and still yield good image quality. Table 2 provides these results. In Table 2, all linear units are inches, and all examples have a system effective focal length (EFL) of 22.7 inches.

TABLE 2

| $n_{il}$ | EFL lens | Rd mirror | n*(EFL lens) | EFL mirror | Petz. Rd |
|---|---|---|---|---|---|
| 1.8 | 17.78 | 56.58 | 32.004 | 28.29 | −243.778 |
| 2.2 | 14.31 | 57.22 | 31.482 | 28.61 | −313.614 |
| 2.8 | 11.44 | 59.2 | 32.032 | 29.6 | −389.863 |
| 3.4 | 9.58 | 60.81 | 32.572 | 30.405 | −457.015 |
| 4.0 | 8.42 | 62.23 | 33.68 | 31.115 | −408.559 |

In Table 2, "EFL lens" is the effective focal length of the immersion lens 130; "Rd mirror" is the radius of the primary mirror 120; "EFL mirror" is the effective focal length of the primary mirror 120, and "Petz. Rd." is the Petzval radius or field curvature. It is highly desirable that the radius of the Petzval be very large if not near infinity, indicating that there is little or no field curvature residual in the overall design.

The robustness of the optical design to variations in the refractive index, nil, of the immersion lens 130 allows a wide variety of different materials to be used for the immersion lens 130. Some examples of suitable materials for the immersion lens 130 include, but are not limited to, nylon, Rexolite™, various plastics, metamaterials, silicon, glass, Germanium, and Sapphire. In certain applications, the use of a metamaterial composed of a dipole loaded plastic foam may be advantageous in that the plastic foam is very light. A lattice of dipoles, generally metals, may be disposed throughout the plastic foam and customized so as to provide a specified $n_{il}$ while minimizing the density of the material so as to preserve the lightweight characteristic of the plastic foam.

Aspects and embodiments may achieve significant performance advances over conventional mm-wave optical systems in aperture size, compact length, FOV size, optical speed, low aperture obscuration, and/or image quality. The short flat-field Schmidt optical form discussed above with reference to FIGS. 1, 2, and 4 provides a unique ability to achieve a mm-wave imaging system with a wide FOV (e.g., up to 20 degrees), fast optical speed, low aberrations, low distortion, low obscuration, and small physical size. As discussed above, embodiments of the optics have demonstrated robustness in ability to yield excellent performance with field/immersion lens materials with a refractive index ranging from approximately 1.6 to 4.0. As will be appreciated by those skilled in the art, there are numerous degrees of freedom available for optimization of the design, even though the optics may include only three elements, namely, the Schmidt corrector, the primary mirror, and the immersion lens. The detailed figures or shapes of the surface of the optical elements are at the designer's discretion. In a preferred embodiment, the optical elements are rotationally symmetric. They may be spherical, conic sections, or rotationally symmetric aspheres. The surfaces in addition to having net positive or negative power by nature of their curvature may also have conic or aspheric departures. Given the benefit of this disclosure, optimization of the design, including surface and material selection/configuration, may be performed using design and simulation tools readily available to and commonly used by those skilled in the art.

Figure 6:
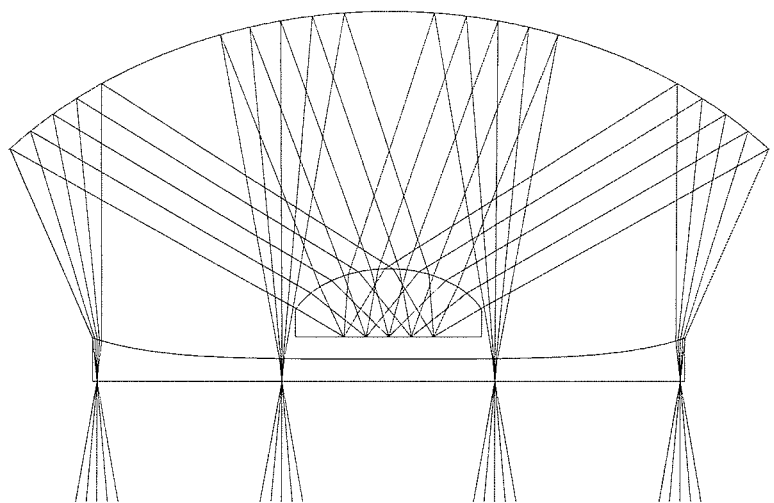
FIG. 6 is a ray trace section of the millimeter-wave optical imaging system corresponding to the optical prescription of FIG. 5, according to aspects of the present invention.

FIG. 5 is a table providing an optical prescription for an illustrative embodiment of the optical system of the present invention. In this illustrative embodiment, the entrance aperture is 52.0 inches diameter and the focal length is 22.69 inches. The system optical speed is F/0.44 and the field of view is 20.0 degrees in diameter. The optical prescription for this illustrative embodiment may be generated using an equation which is an industry standard and which would be known to those skilled in the art. In the table of FIG. 5, the column designated Rd is the radius in inches of the specific surfaces. The minus sign indicates that the center of curvature is to the left of the mirror surface. The column designated cc is the conic constant which is equal to the negative squared value of the eccentricity of a conic section (a planar cut through a double sheeted conic surface). The columns designated Ad, Ae, Af and Ag are the aspheric constants of the specific surfaces. FIG. 6 is a ray trace section of an optical system corresponding to the optical prescription provided in the table of FIG. 5.

Figure 7:
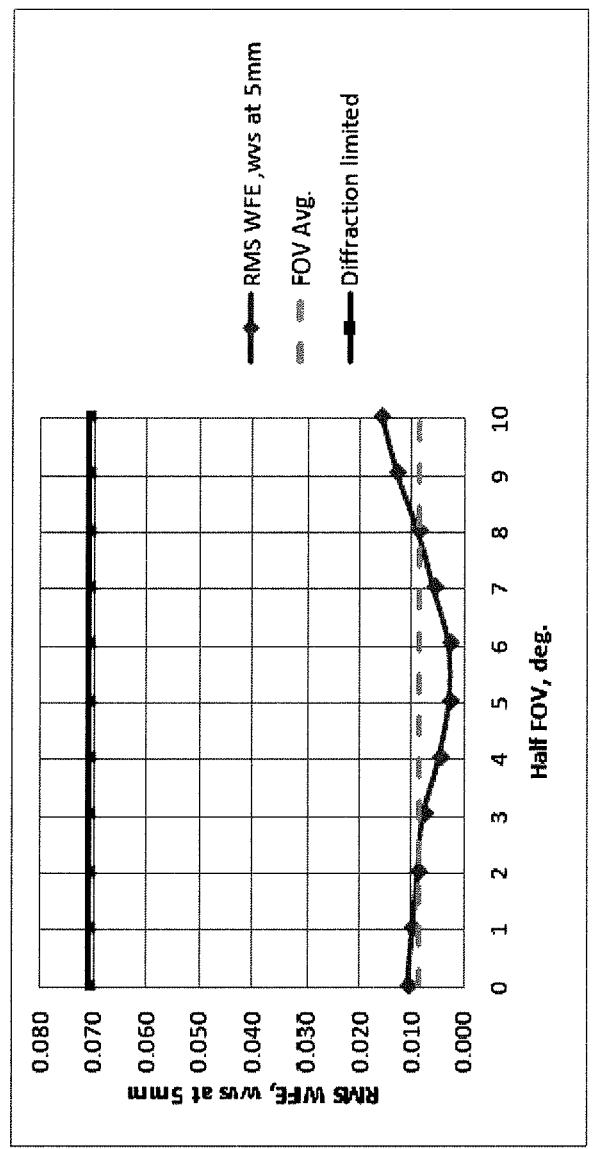
FIG. 7 is a graph illustrating wavefront error as a function of field of view for the exemplary optical system of FIG. 6 and corresponding optical prescription of FIG. 5.

Referring to FIG. 7, for the optical design of FIGS. 5 and 6, the RMS wavefront error (WFE) averages approximately 0.0085 wvs across the FOV at a wavelength of 5 mm. This means that the design is diffraction limited at 0.6 mm, or about $\frac{1}{8}^{th}$ of the operational wavelength. This leaves ample allocation for fabrication and alignment tolerances, or variations in the optimization of the optical parameters of the system.

Thus, aspects and embodiments provide a mm-wave optical imaging system having a compact optical form (in certain examples including just three optical elements), high degree of flexibility in the design (i.e., robustness to variations in parameters of the optical elements, such as the refractive index of the immersion lens material, for example), and a wide field of view. As discussed above, for many applications, this wide field of view (e.g., approximately 20 degrees) may advantageously eliminate the need for steering/pointing the optical system using a gimbal or other mechanical steering device, and additionally may opens up a variety of other capabilities.

Figure 8:
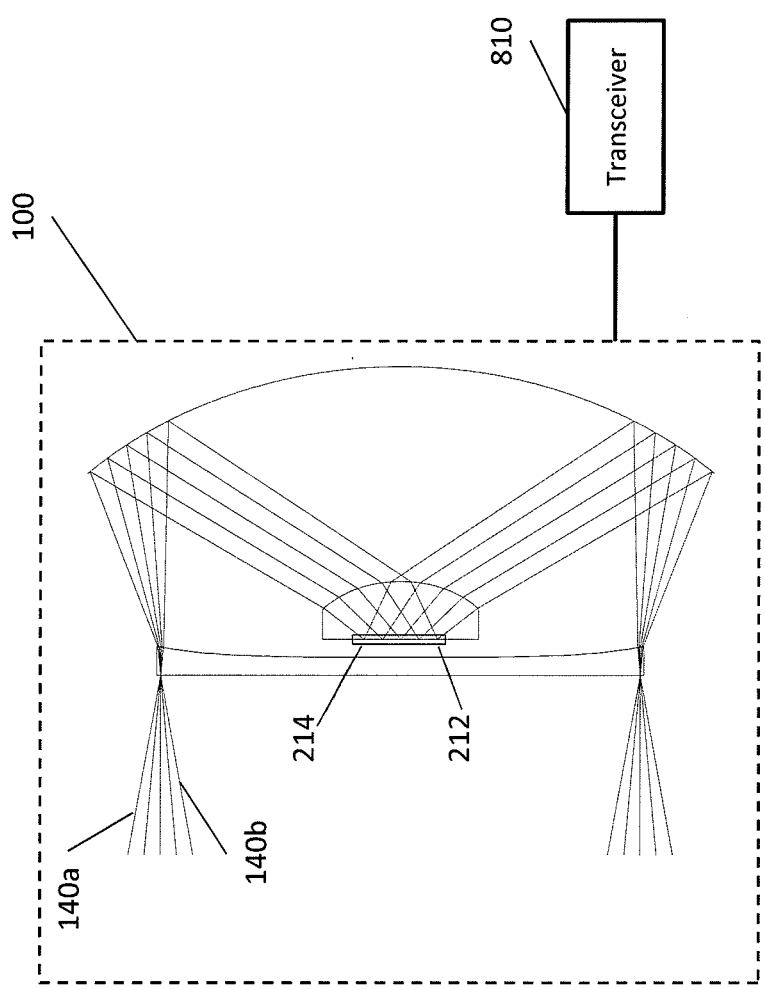
FIG. 8 is a diagram of one example of a communication system incorporating an example of a millimeter-wave optical imaging system according to aspects of the invention.

For example, because the optical system is an imaging system, each ray of electromagnetic radiation entering via the system aperture stop from a given fixed direction is imaged onto a pixel of the imaging detector array 210. Pixel selection is a function of the angle of incidence of the rays at the system aperture (i.e., on the Schmidt corrector 110 in the illustrated example), as indicated by well-know first-order imaging equations. Thus, referring to FIG. 8, a ray/signal 140*a* from a particular object point, for example, will be received at a first angle of incidence, and thus imaged onto a first region 212 of the detector array 210 (corresponding to first pixel); whereas a ray/signal 140*b* from a different object point will be received at a different angle of incidence, and thus imaged onto a second detector region/pixel 214. As a result, the detector array 210 may be coupled to a transceiver 810, and different pixels of the array may be correlated to different channels of a communication system, such that the optical system can be used to simultaneously transmit/receive mm-wave signals over multiple channels, without requiring multiplexing or other techniques typically associated with multi-channel communication systems.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A millimeter-wave optical imaging system comprising:
an imaging detector located at a focal plane of the optical imaging system, the imaging detector being responsive to electromagnetic radiation in wavelength range of approximately 5-50 millimeters;
an immersion lens directly coupled to the imaging detector and configured to focus the electromagnetic radiation onto the imaging detector, the immersion lens having a curved first surface and an opposing planar second surface, wherein the focal plane is located on the planar second surface and the imaging detector is directly coupled to the planar second surface;
a positive power primary mirror configured to reflect the electromagnetic radiation directly onto the immersion lens; and
a Schmidt aspheric corrector configured to receive and direct the electromagnetic radiation towards the primary mirror, a system aperture stop being located on the Schmidt aspheric corrector, and wherein the imaging detector is interposed between the immersion lens and the Schmidt aspheric corrector.

2. The millimeter-wave optical imaging system of claim 1, wherein the imaging detector is a focal plane array sensor.

3. The millimeter-wave optical imaging system of claim 1, wherein the primary mirror is a spherical mirror.

4. The millimeter-wave optical imaging system of claim 1, wherein the primary mirror is a conic mirror.

5. The millimeter-wave optical imaging system of claim 1, wherein the primary mirror is an aspheric mirror.

6. The millimeter-wave optical imaging system of claim 1, wherein the first surface of the immersion lens is spherical.

7. The millimeter-wave optical imaging system of claim 1, wherein the first surface of the immersion lens is conic.

8. The millimeter-wave optical imaging system of claim 1, wherein the first surface of the immersion lens is aspheric.

9. The millimeter-wave optical imaging system of claim 1, wherein the immersion lens is composed of a material having a refractive index in a range of approximately 1.6-4.0.

10. The millimeter-wave optical imaging system of claim 9, wherein the system has a field of view of approximately 20 degrees.

11. The millimeter-wave optical imaging system of claim 10, wherein the system has an optical speed of approximately F/0.44.

12. The millimeter-wave optical imaging system of claim 10, wherein the imaging sensor includes a two-dimensional array of pixels, and wherein each pixel has a width approximately equal to one half a central operating wavelength of the system.

13. The millimeter-wave optical imaging system of claim 12, wherein the central operating wavelength is approximately 5 mm.

14. The millimeter-wave optical imaging system of claim 1, further comprising a transceiver coupled to the imaging sensor; and
  wherein the imaging sensor includes a two-dimensional array of pixels, a first pixel of the array being associated with a first communication channel of the transceiver, and a second pixel of the array being associated with a second communication channel of the transceiver.

15. A method of imaging in a millimeter-wave spectral band comprising:
  receiving electromagnetic radiation in the millimeter-wave spectral band via a system aperture stop located on a Schmidt corrector;
  directing the electromagnetic radiation from the Schmidt corrector to a positive power primary mirror;
  reflecting the electromagnetic radiation from the primary mirror directly onto an immersion lens;
  focusing the electromagnetic radiation with the immersion lens onto a focal plane located on a rear surface of the immersion lens; and
  imaging the electromagnetic radiation with an imaging detector array configured for the millimeter-wave spectral band, the imaging detector being located at the focal plane, directly coupled to the rear surface of the immersion lens, and interposed between the immersion lens and the Schmidt corrector.

* * * * *